United States Patent
Pereira Lemos (10) Patent No.: US 11,898,622 B2
(45) Date of Patent: Feb. 13, 2024

(54) EPICYCLIC REDUCER FOR A WHEEL HUB AND VEHICLE

(71) Applicant: IVECO S.P.A., Turin (IT)

(72) Inventor: Jose Francivaldo Pereira Lemos, Sete Lagoas (BR)

(73) Assignee: IVECO S.P.A., Turin (IT)

( * ) Notice: Subject to any disclaimer, the term of this patent is extended or adjusted under 35 U.S.C. 154(b) by 307 days.

(21) Appl. No.: 17/421,120

(22) PCT Filed: Dec. 23, 2019

(86) PCT No.: PCT/BR2019/050561
§ 371 (c)(1),
(2) Date: Jul. 7, 2021

(87) PCT Pub. No.: WO2020/142820
PCT Pub. Date: Jul. 16, 2020

(65) Prior Publication Data
US 2022/0107004 A1  Apr. 7, 2022

(30) Foreign Application Priority Data
Jan. 9, 2019  (BR) .......................... 102019000446-0

(51) Int. Cl.
*B60K 17/04* (2006.01)
*F16H 1/28* (2006.01)
(Continued)

(52) U.S. Cl.
CPC ............. *F16H 1/28* (2013.01); *B60K 17/046* (2013.01); *F16H 3/002* (2013.01); *F16H 9/26* (2013.01); *B60Y 2200/1422* (2013.01)

(58) Field of Classification Search
CPC ..... F16H 3/002; F16H 3/54; F16H 2200/0034; B60K 17/046
(Continued)

(56) References Cited

U.S. PATENT DOCUMENTS 1,240,318 A * 9/1917 Copeland ................... F16H 3/54
475/299
2,331,684 A * 10/1943 Henningsen ............... F16H 3/54
475/299
(Continued)

FOREIGN PATENT DOCUMENTS

BR       PI0400810       9/2005
CN       201834015       5/2011
(Continued)

OTHER PUBLICATIONS

European Search Report in EP Application No. 19909153.9-1012/3910212, dated Aug. 23, 2022 (8 pages).

*Primary Examiner* — Sherry L Estremsky
(74) *Attorney, Agent, or Firm* — Leason Ellis LLP (57) ABSTRACT

The invention relates to an epicyclic reducer for a vehicle hub that includes: a housing; a sun gear arranged in the housing that includes sun teeth and is configured for coupling to an input; a plurality of planet gears, each of which includes planet teeth meshed with some of the sun teeth; a planet carrier that couples the planet gears to each other and is configured as an output; and a ring gear that includes ring teeth meshed with some of the planet teeth of each of the planet gears. The ring gear can be moved within the housing between a reduction position in which the planet gears are configured to rotate relative to the ring gear, and a direct drive position in which the ring gear is constrained to rotate with the planet gears.

17 Claims, 7 Drawing Sheets

(51) Int. Cl.
*F16H 9/26* (2006.01)
*F16H 3/00* (2006.01)

(58) Field of Classification Search
USPC .................................................. 475/299, 298
See application file for complete search history.

(56) References Cited

U.S. PATENT DOCUMENTS

| | | | |
|---|---|---|---|
| 3,481,222 A | 12/1969 | Baron | |
| 3,828,627 A * | 8/1974 | Schwerdhofer | B62M 11/14 |
| | | | 475/299 |
| 4,667,538 A * | 5/1987 | Larsson | F16H 37/046 |
| | | | 475/299 |
| 4,821,591 A * | 4/1989 | Adler | F16H 3/78 |
| | | | 475/299 |
| 5,006,100 A * | 4/1991 | Brandt | F16H 3/54 |
| | | | 475/299 |
| 6,066,062 A * | 5/2000 | Pigozzi | F16H 37/046 |
| | | | 192/69.7 |
| 6,117,040 A * | 9/2000 | Watterodt | B60K 17/046 |
| | | | 475/299 |
| 8,342,612 B2 | 1/2013 | Francheschi | |
| 9,156,353 B2 * | 10/2015 | Dedo | B60K 28/165 |

FOREIGN PATENT DOCUMENTS

| | | |
|---|---|---|
| DE | 202014001121 | 5/2015 |
| DE | 202014001121 U1 | 5/2015 |
| FR | 1597388 A | 6/1970 |
| FR | 2499480 | 8/1982 |
| JP | S57147 U | 1/1982 |

* cited by examiner

EPICYCLIC REDUCER FOR A WHEEL HUB AND VEHICLE

CROSS-REFERENCE TO RELATED APPLICATIONS

This application is a national stage filing under 35 U.S.C. § 371 of international application number PCT/BR2019/050561, filed Dec. 23, 2019, which claims priority to Brazilian patent application No. 102019000446-0, filed Jan. 9, 2019. The contents of these applications are incorporated herein by reference in their entirety.

BACKGROUND OF THE INVENTION

The present invention relates to vehicles and, in particular, to epicyclic reducers for them.

Vehicles, such as trucks, are often used to tow heavy loads. Such a vehicle generally includes a heat engine, which is coupled to the drive wheels through a transmission. The transmission generally features a gearbox that rotatably couples a drive shaft to the engine. The half shafts, which are used to drive the wheels, are rotatably coupled to the drive shaft, for example, by means of one or more differentials. The half shafts turn a wheel hub, which is connected to the wheels to rotate them. This allows the rotary engine to give power to the wheels to rotate them and move the vehicle.

For trucks and other large vehicles, it is known to provide two-stage speed reduction in order to rotate the wheels at a lower rotational speed than that of the engine and increase their torque. The first stage of reduction generally takes place in the gearbox. However, due to the high torque demands on the wheels, the gearbox, in general, cannot provide the desired reduction while maintaining the required ground clearance. To provide additional reduction, a second stage can be provided at the wheel hub, for example, with use of an epicyclic gearbox.

An epicyclic reducer may include a planetary gear set with a central sun gear, a plurality of planetary gears meshed with the sun gear, a planetary carrier coupling the planetary gears together, and a sprocket meshed with the planetary gears. The sun gear can be coupled to the axle shaft to act as an input,
and the planetary carrier acts as an output to drive the wheel hub and wheels. In this way, the epicyclic gearbox provides additional speed reduction and torque to the drive wheels. However, speed reduction comes at a cost.

The engine needs to rotate at higher speeds to drive the wheels at the same speed as an unreduced configuration, which increases fuel consumption.

What is needed in the technique is a transmission system to drive vehicle wheels requiring less fuel consumption than known systems.

BRIEF DESCRIPTION OF THE INVENTION

The present description provides an epicyclic reducer with a sprocket that can be shifted between a reduction position and a direct drive position. In some examples provided in accordance with the present disclosure, an epicyclic gearbox for a vehicle hub includes: a housing; a sun gear disposed in the housing that includes sun teeth and is configured to couple to an input; a plurality of planetary gears, each of which includes planet teeth meshed with some of the sun teeth; a planetary carrier that couples the planetary gears to each other and is configured as an output; and a sprocket that includes ring teeth engaged to some of the planet teeth of each of the planetary gears. The sprocket is movable within the housing between a reduction position in which the planetary gears are configured to rotate relative to the sprocket and a direct drive position in which the sprocket is rotatably locked with the planetary gears.

In some exemplary embodiments provided in accordance with the present disclosure, a vehicle includes: a chassis; an engine carried by the chassis; a gearbox configured to couple to the engine; a drive shaft rotatably coupled to the gearbox; an axle shaft rotatably coupled to the drive shaft; and a wheel hub carried by the chassis and including an epicyclic reducer. The epicyclic reducer includes: a housing; a sun gear disposed in the housing including sun teeth and rotatably coupled to the axle shaft; a plurality of planetary gears, each of which includes planet teeth meshed with some of the sun teeth; a planetary carrier that couples planetary gears together and configured as an output; and a sprocket that includes ring teeth meshed with some of the planet teeth of each of the planetary gears. The sprocket is movable within the housing between a reduction position in which the planetary gears are configured to rotate relative to the sprocket and a direct drive position in which the sprocket is rotatably locked with the planetary gears.

A possible advantage of the exemplary embodiments of the epicyclic reducer disclosed in this document is that the ring gear can be moved to the direct drive position when there is a reduced torque demand on the wheel, such as when the vehicle is unloaded, in order to eliminate wheel hub speed reduction and increase fuel efficiency.

Another possible advantage of the exemplary embodiments of the epicyclic reducer disclosed in this document is that it can be retrofitted to vehicles, so that the ring gear is displaced by the vehicle using an existing pressurized gas system.

BRIEF DESCRIPTION OF THE FIGURES

The foregoing and other features and advantages of this invention and the manner of achieving them will become more apparent and the invention will be better understood by reference to the following descriptions of embodiments of the invention obtained in conjunction with the accompanying Figures, in which.

Corresponding reference characters indicate corresponding parts throughout the various views. The examples set forth herein illustrate disclosures of the invention and such examples are not to be construed as limiting the scope of the invention in any way.

DETAILED DESCRIPTION OF THE INVENTION

Figure 1:
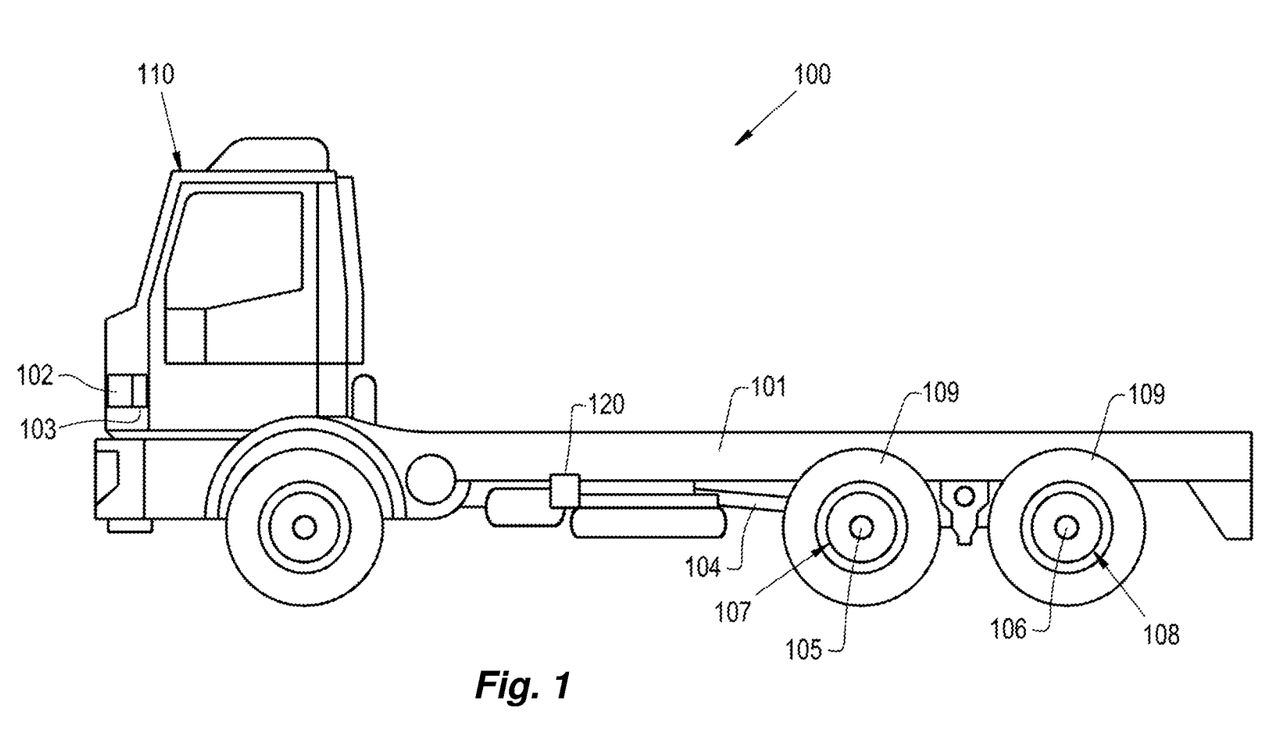
FIG. 1 is a side view of an exemplary embodiment of a vehicle that includes a wheel hub formed in accordance with the present disclosure.

Referring now to the Figures, and more particularly to FIG. 1, an exemplary embodiment of a vehicle 100 formed in accordance with the present disclosure is illustrated. In the illustrated embodiment, the vehicle 100 is a truck that includes a chassis 101 and a thermal machine, such as an engine 102, carried by the chassis 101. The engine 102 can be an internal combustion engine, for example, driven by chemical fuel, such as petrol or diesel, stored in a tank, an electric motor powered by current from a battery, or a hybrid combination output from either an internal combustion engine or an electric motor. A gearbox 103 is provided to transmit output power from the motor 102 to a rotatably coupled drive shaft 104. It is a well-known fact that the gearbox 103 can provide a first stage of speed reduction from the motor 102 to the drive shaft 104. The drive shaft 104 is rotatably coupled to one or more half shafts 105, 106, for example, by means of one or more differentials carried by the chassis 101. The axle shafts 105, 106 couple to the respective wheel hubs 107, 108 so that rotation of the axles 105, 106 causes a corresponding rotation of a portion of the wheel hubs 107, 108. The wheels 109 are mounted on the wheel hubs 107, 108, then the rotated portions of the wheel hubs 107, 108 cause the wheels 109 to rotate to move the vehicle 100. The vehicle 100 may also include an operator cabin 110 in which an operator controls the vehicle 100 during operation, as is known.

Figure 2A:
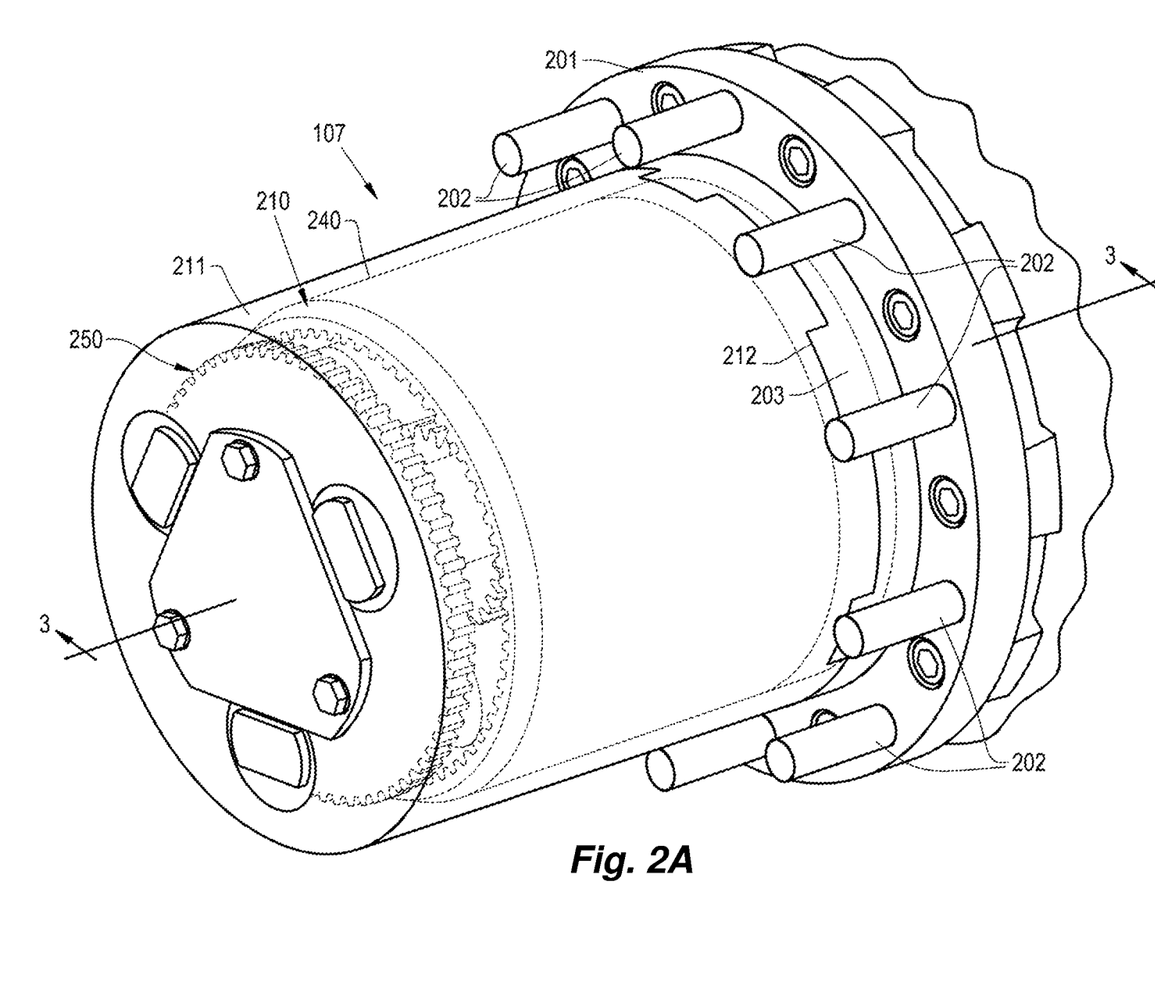
FIG. 2A is a perspective view of an exemplary embodiment of a wheel hub with an epicyclic reducer formed in accordance with the present disclosure, partially illustrated in dashed lines.
Figure 2B:
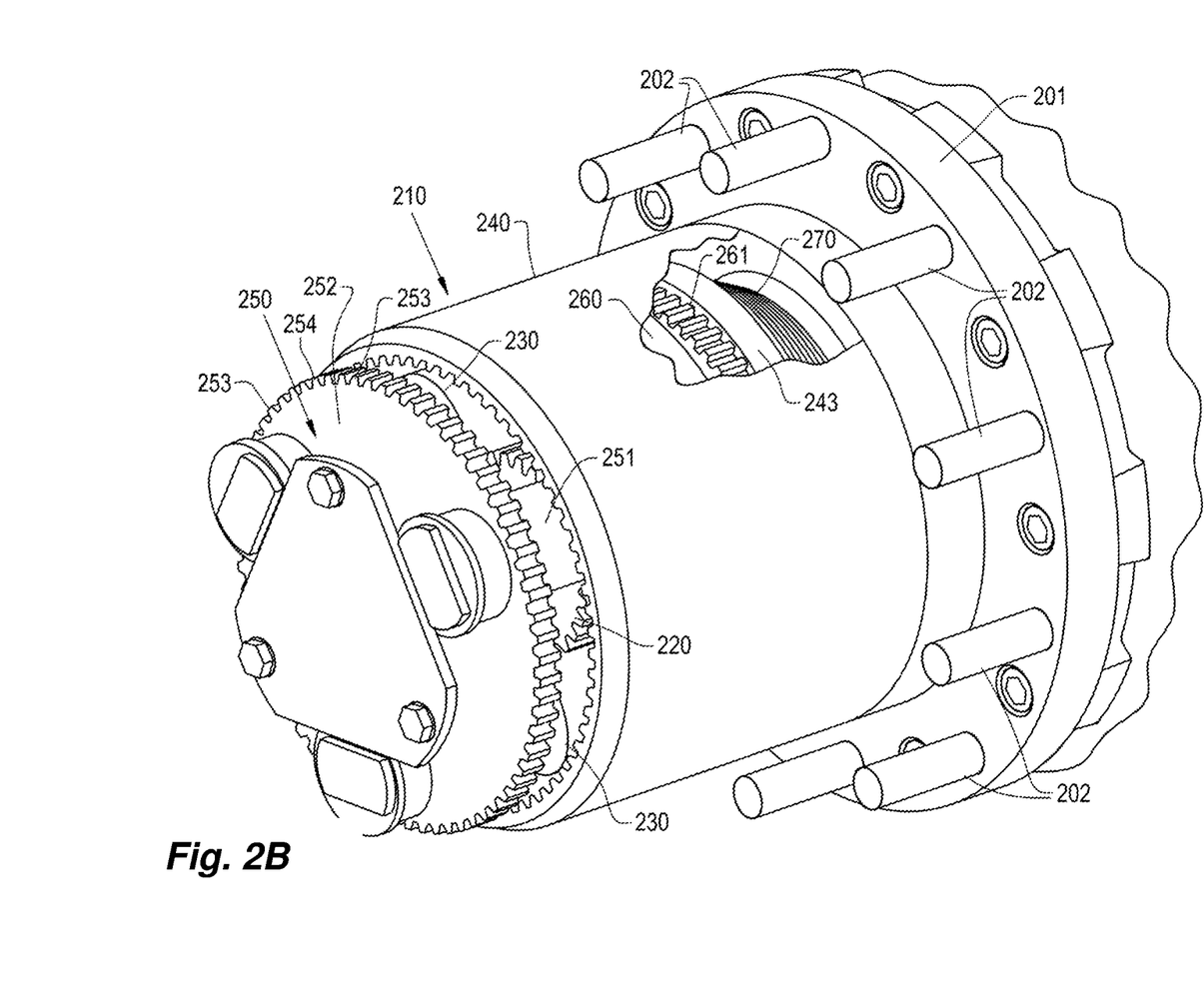
FIG. 2B is a partially cut-away perspective view of the wheel hub illustrated in FIG. 2A with an epicyclic reducer housing removed to illustrate the internal workings of same.

Referring now to FIGS. 2A and 2B, an exemplary embodiment of one of the wheel hubs 107 formed in accordance with the present disclosure is illustrated. Although the wheel hub 107 is illustrated in FIGS. 2A and 2B, it should be noted that the wheel hub 108 can be configured in a similar manner. The wheel hub 107 generally includes a wheel mounting portion 201 and an epicyclic reducer 210 rotatably coupled to the wheel mounting portion 201. The wheel mounting portion 201 includes a plurality of screws 202 for mounting the wheels 109 to the wheel hub 107, as is known.

The epicyclic reducer 210 includes a housing 211 that encloses the gears 220, 230, 240, which will be described later in this document. The housing 211 rotatably couples to the wheel mounting portion 201 to impart rotation to the mounting portion 201 and rotate the mounted wheels 109. The housing 211 may include, for example, a keyed portion 212 which rotatably locks with a corresponding keyed portion 203 of the wheel mounting portion 201. It should be noted that the housing 211 can be rotatably coupled to the wheel mounting portion 201 in other ways, and the coupling previously described is only exemplary.

Figure 3:
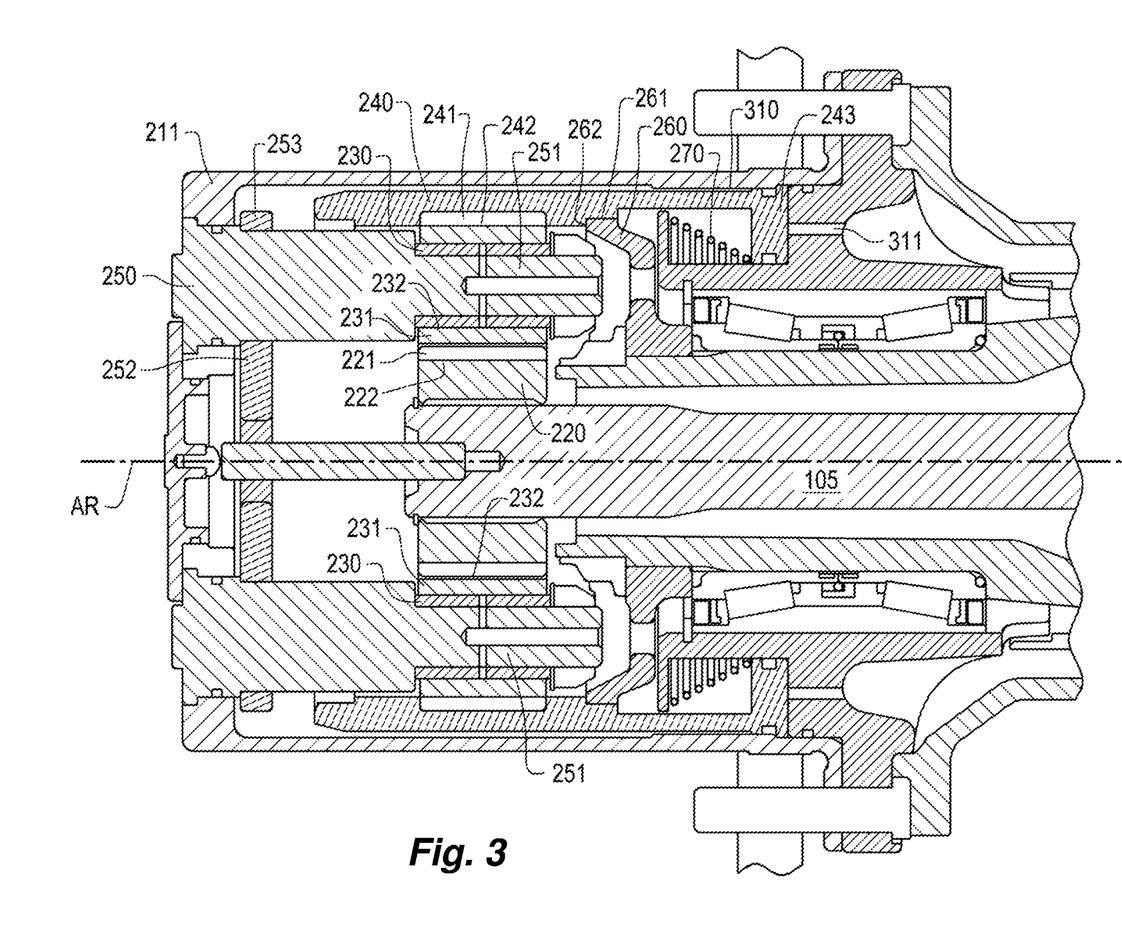
FIG. 3 is a cross-sectional view of the wheel hub illustrated in FIGS. 2A and 2B taken along line 3-3 in FIG. 2A.

Particularly with reference now to FIG. 2B, and to FIG. 3 as well, the internal workings of the epicyclic reducer 210 are illustrated. The epicyclic reducer 210 includes a sun gear 220 configured as an input, a plurality of planetary gears 230 in toothed engagement with the sun gear 220, a planetary carrier 250 that couples the planetary gears 230 together and is configured as an output, and a ring gear 240 which surrounds the 230 planetary gears and is meshed with the 230 planetary gears. The sun gear 220 is rotatably coupled to the axle shaft 105, so rotation of the axle shaft 105 also rotates the sun gear 220. The sun gear 220 can be rotatably coupled to the axle shaft 105 in any suitable manner. The sun gear 220 rotates at the same rotary speed as the axle shaft 105 due to its rotary coupling.

The sun gear 220 includes a plurality of sun teeth 221 on the circumference thereof 222. The number of sun teeth 221 and the spacing and shape of the sun teeth 221 can be varied as is known. Each planetary gear 230 includes a plurality of planet teeth 231 on the circumference thereof 232. The number and spacing of the planet teeth 231 can be varied, as is known. Some of the planetary gears 231 of each planetary gear 230 mesh with some of the sun gears 221 of the sun gear 220, so the planetary gears 230 are meshed with the sun gear 220. The mesh between the planetary gears 230 and the sun gear 220 allows the sun gear 220 to turn the planetary gears 230 as the former rotates. It should be noted that although the epicyclic reducer 210 is illustrated with three planetary gears 230 meshed with the sun gear 220, the number of planetary gears 230 can be changed as is known.

The planetary carrier 250 couples the planetary gears 230 together and helps keep them meshed with the sun gear 220. As illustrated, the planetary carrier 250 may include a plurality of spaced mounting shafts 251. Each of the planetary gears 230 can be mounted on a respective mounting shaft 251 and rotate around this shaft when rotated by the sun gear 220, as will be described later in this document. Rotation of the planetary gears 230 around a geometrical axis of the rotating carrier AR, which is generally coaxial with the rotating shaft 105, causes a corresponding rotation of the planetary carrier 250 around the geometrical axis of the rotating carrier AR. As illustrated in FIG. 2A, the planetary carrier 250 can be rotatably coupled to the housing 211, so rotation thereof causes a corresponding rotation of the housing 211, and thus rotation of the wheel mounting portion 201 and the mounted wheel 109. This swivel coupling between the planetary carrier 250 and the housing 211 allows said carrier to act as an output of the epicyclic reducer 210, but it should be noted that the planetary carrier 250 can be configured as an output in other modes. In some embodiments, the planetary carrier 250 includes a carrier ring 252 with support teeth 253 on the circumference thereof 254, the significance of which will be described later in this document.

The ring gear 240 surrounds the planetary gears 230 and has ring teeth 241 on the inner circumference 242 that mesh with some of the gear teeth 231 of the planetary gears 230, so the ring gear 240 and the planetary gears 230 are meshed together. As illustrated in FIGS. 2A to 3, the ring gear 240 is in a reduction position where the planetary gears 230 can rotate, relative to the ring gear 240, when the sun gear 220 rotates, i.e., the ring gear 240 and the 230 planetary gears are not rotatably locked together. In some embodiments, the epicyclic reducer 210 includes a locking band 260 with locking teeth 261 formed on the outer circumference thereof 262 that meshes with at least some of the ring teeth 241, so the ring gear 240 is not rotatably locked onto the planetary gears 230 when it is in the lowering position, which allows the planetary gears 230 to rotate relative to the ring gear 240.

Since the ring gear 240 is not rotatably locked onto the planetary gears 230 in the lowering position, these gears 230 will tend to rotate around the mounting shafts 251 and along the inner circumference 242 of the ring gear 240 when the sun gear 220 rotates, i.e. the planetary gears 230 rotate together. The planetary gears 230 rotate around the geometrical axis of the rotating carrier AR. As is known, the rotation of the planetary gears 230 causes them to rotate at a lower angular speed around the geometrical axis of the rotating carrier AR than the rotary speed of the sun gear 220. The rotational speed of the planetary gears 230 around the geometrical axis of the rotating carrier AR controls a rotational speed of the planetary carrier 250, which is the output of the epicyclic reducer 210, around the geometrical axis of the rotating carrier AR. Thus, the rotational speed of the planetary carrier 250 is slower than the rotational speed of the axle shaft 105 and coupled the sun gear 220 when the ring gear 240 is in the reduction position. The lower relative rotary speed of the planetary carrier 250 provides a second stage of reduction and increases the torque that is transmitted to the wheel 109 mounted on the mounting portion 201 of the wheel hub 107.

Although two-stage speed reduction is useful when there are high torque demands to drive the wheels 109, such as when the vehicle 100 is loaded, the relatively high rotary speed of the engine 102, compared to the wheels 109, significantly increases fuel consumption. This high fuel consumption is not guaranteed when, for example, the vehicle 100 is unloaded and simply travelling from one place to another. In such situations, high torque transmission to the wheels 109 is wasted due to the fact that torque demand on the wheels 109 is not high. Thus, two-stage downshifting is not always helpful, and can actually be detrimental in some situations due to relatively low fuel consumption.

Figure 4A:
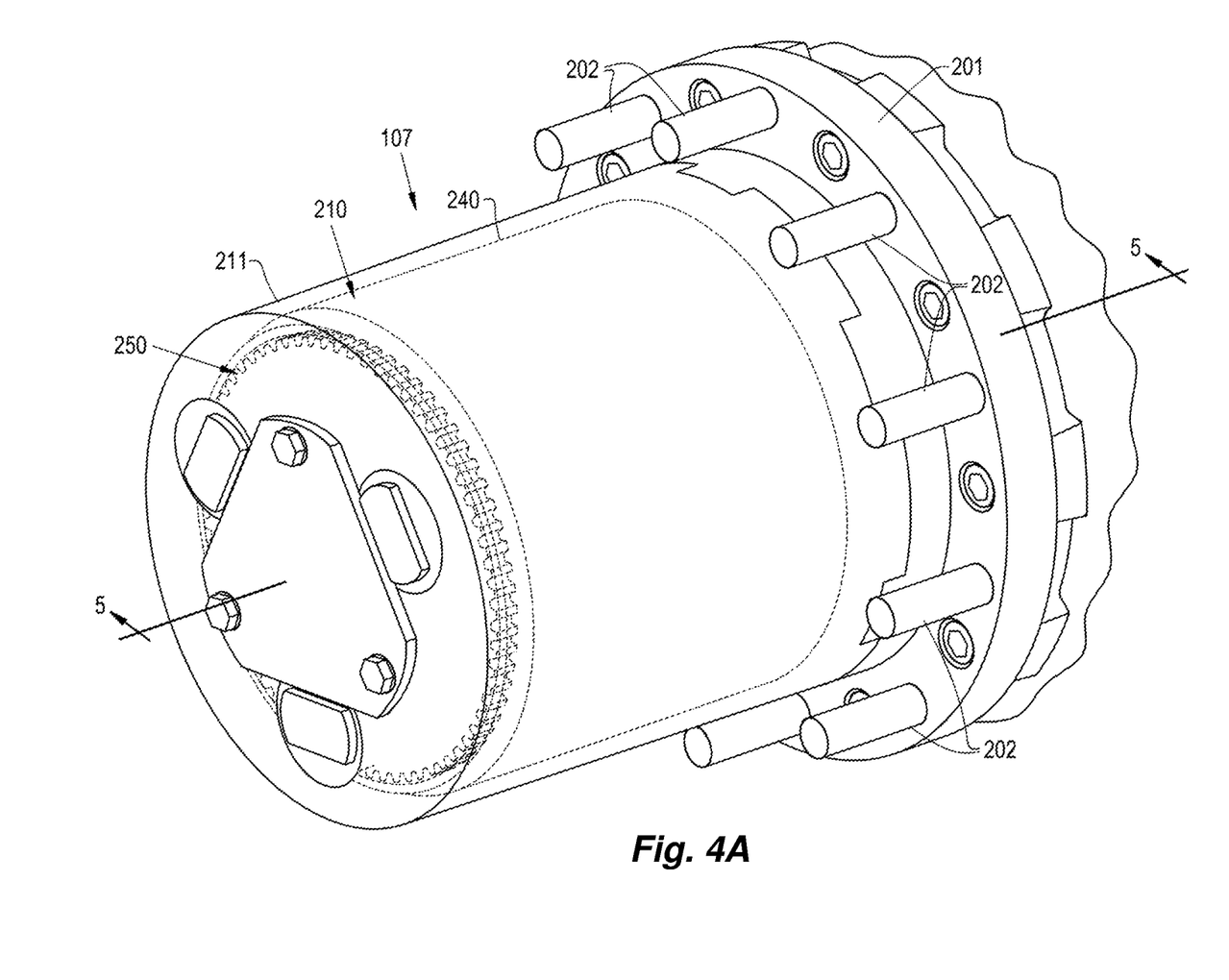
FIG. 4A is a perspective view of the wheel hub illustrated in FIGS. 2A, 2B, and 3 when an epicyclic reducer ring gear, which is shown in dashed lines, has been moved to a direct drive position.
Figure 4B:
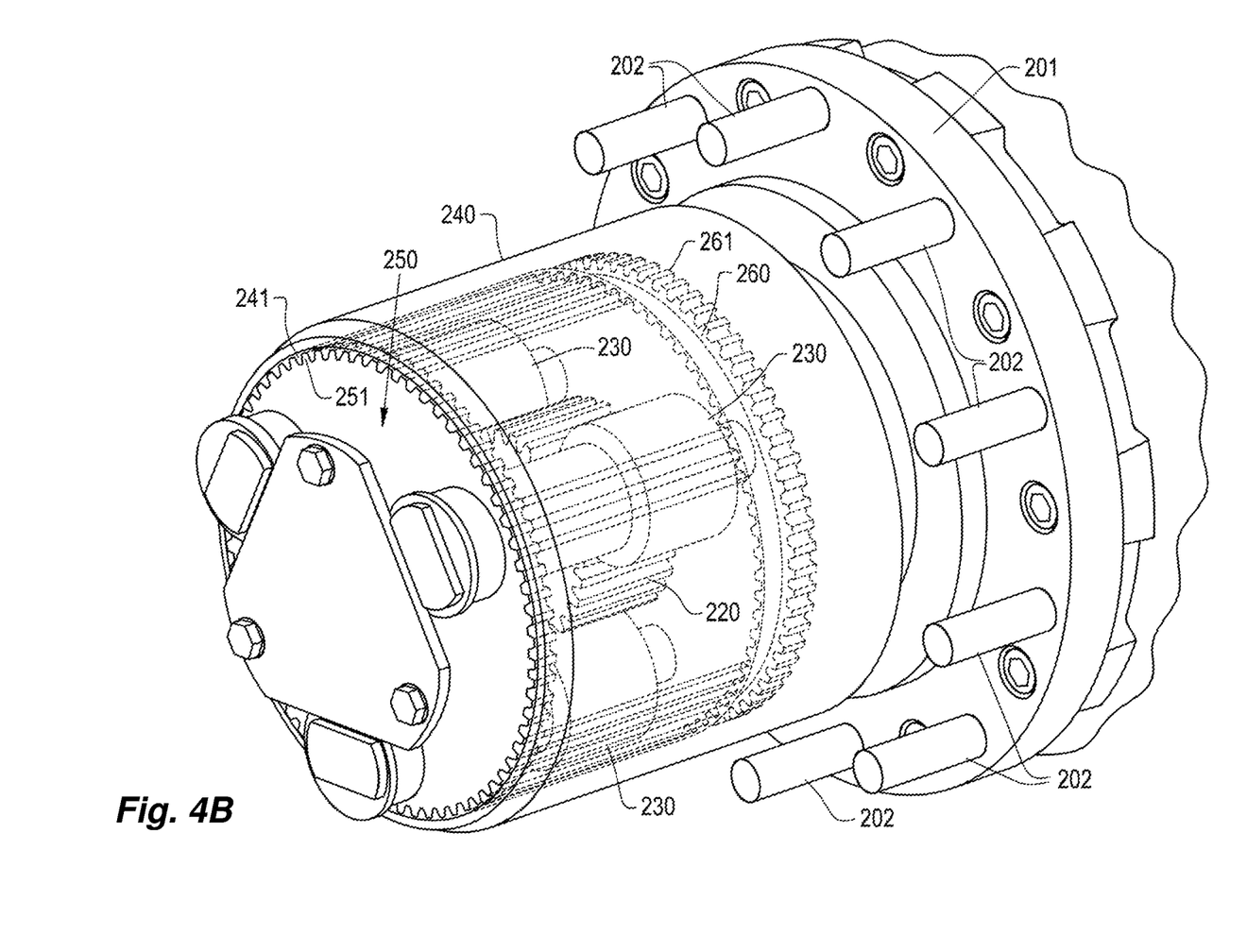
FIG. 4B is a partially cut-away perspective view of the wheel hub illustrated in FIG. 4A with the housing removed to illustrate the internal workings of the epicyclic reducer.
Figure 5:
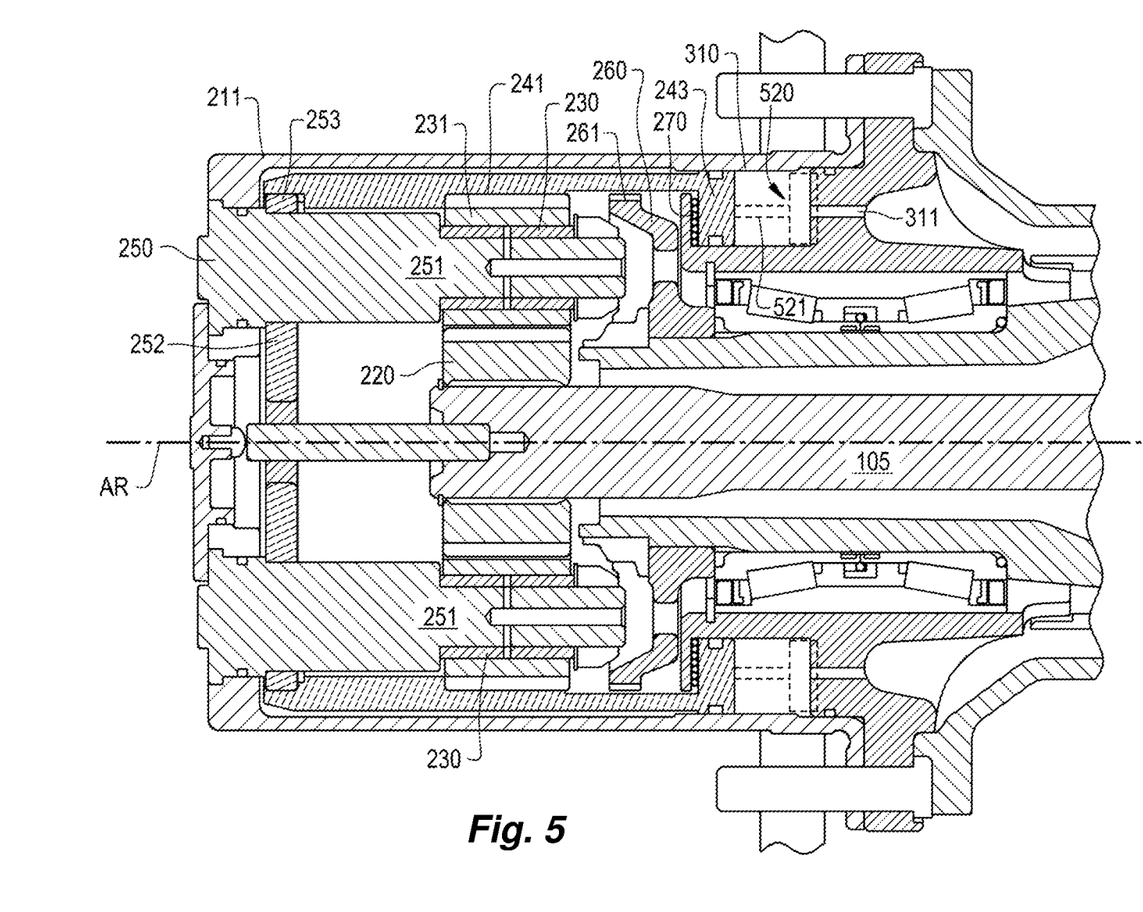
FIG. 5 is a cross-sectional view of the wheel hub illustrated in FIGS. 4A and 4B taken along line 5-5 in FIG. 4A.

To increase fuel efficiency, and with reference now to FIGS. 4A, 4B and 5, it is illustrated how the ring gear 240 is displaceable from the reduction position, illustrated in FIGS. 2A, 2B and 3, to a position of direct drive in which the rotary speed of the planetary carrier 250 is the same as that of the sun gear 220 and thus the axle shaft 105. In the direct drive position, the ring gear 240 is rotatably locked onto the planetary gears 230, so the planetary gears 230 no longer rotate along the inner circumference 242 of the ring gear 240 and around the geometrical axis of the rotating carrier AR. In contrast, the planetary gears 230 rotate around the geometrical axis of the rotating carrier AR at the same rotational speed as the sun gear 220. Thereby, the rotary speed of the planetary carrier 250 around the geometrical axis of the rotating carrier AR becomes substantially equal to the rotary speed of the sun gear 220, and thus of the axle shaft 105. In this sense, the epicyclic reducer 210 is in a direct drive mode, when the ring gear 240 is moved to the direct drive position, then the rotating speed of the wheel 109 is substantially equal to the rotating speed of the axle shaft 105, after taking into account losses due, for example, to friction. The epicyclic reducer 210 which is in direct drive mode allows the speed ratio between the engine 102 and the wheel 109 to be controlled in the gearbox 103.

In some embodiments, the ring gear 240 is rotatably locked onto the planetary gears 230 by disengaging the ring teeth 241 from the locking teeth 261 of the locking band 260, while maintaining the gear between the ring teeth 241 and the planet teeth 231 of the planetary gears 230. The ring teeth 241 can also be meshed with the support teeth 253 of the planetary carrier 250 while the ring gear 240 is in the direct drive position. In this sense, the ring gear 240 can be axially displaceable, parallel to the geometrical axis of the rotating carrier AR, to engage and disengage several teeth within the epicyclic reducer 210 and switch between the reduction position and the direct drive position.

Referring specifically now to FIGS. 2B, 3, 4B and 5, it is illustrated that the ring gear 240 may include a piston 243 disposed in a groove 310 (first illustrated in FIG. 3) of the housing 211. A biaser 270, which may be a compression spring, may be placed in the groove 310 and supported on the piston 243 to urge the piston 243 and thereby the ring gear 240 to a desired position. In the illustrated embodiment, the compression spring 270 is placed in the slot 310 to be supported on the piston 243 and propel the ring gear 240 towards the reduction position. In the absence of any counter-force exerted on the piston 243, the ring gear 240 will remain in the reduction position when actuated by compression the spring 270, then the epicyclic reducer 210 acts to reduce rotational speed and increase the wheel torque 109. It should be noted that the biaser 270 can also be positioned to drive the ring gear 240 to the direct drive position, so a counterforce is required to shift the latter to the lowering position. It should additionally be understood that while the biaser 270 is illustrated as a compression spring, it may take other forms, such as, for example, a tension spring or a pressurized air charge.

To move the piston 243 to the groove 310, and the ring gear 240 to the direct actuation position, the housing 211 may include a fluid inlet 311 (first illustrated in FIG. 3) that is fluidly coupled to the groove 310. The fluid inlet 311 may be fluidly coupled, for example, to a pressurized gas system 120 (illustrated in FIG. 1) of the vehicle 100. The pressurized gas system 120 may sometimes be the system that controls the flow of pressurized gas to the vehicle air springs 100. Such systems are known, so further description is omitted for brevity.

When it is desired to propel the ring gear 240 to the direct actuation position, an operator may use a switch in the operator's cabin 110 to signal the pressurized gas system 120 to supply pressurized gas to the slot 310 through the fluid inlet 311. Pressurized gas supplied to the groove 310 acts on the piston 243 to counteract the force of the compression spring 270. When sufficient fluid pressure acts on the piston 243 to overcome the force exerted by the compression spring 270, the piston 243 travels in the groove 310 parallel to the geometrical axis of the rotating carrier AR of the planetary carrier 250. The displacement of the piston 243 causes a corresponding displacement of the ring gear 240 from the reduction position to the direct actuation position.

When it is desired to return the ring gear 240 to the reduction position, the operator can use the switch in the operator cabin 110 to signal the pressurized fluid in the slot 310 to be purged, such as opening a coupled valve. Purging the pressurized fluid removes the counterforce on the piston 243 that overcomes the force of the compression spring 270, then the compression spring 270 propels the ring gear 240 to the reduction position.

Although a physical element (the compression spring 270) is illustrated as propelling the ring gear 240 to the lowering position, in some embodiments the ring gear 240 is switched between the lowering position and direct drive position simply by using fluid pressure. For example, pressurized fluid can be supplied to the slot 310 to move the ring gear 240 from the lowering position to the direct drive position. To move the ring gear 240 back to the reduction position, a vacuum can be formed at the fluid inlet 310 which pulls said gear 240 to that position. Alternatively, a vacuum can be formed in the slot 310 to move the ring gear 240 to the direct actuation position, and pressurized fluid can be supplied to the slot 310 to move the ring gear 240 to the reduction position.

In an alternative embodiment, an actuator 520 (shown in dashed lines in FIG. 5) has an actuator stem 521 coupled to the ring gear 240 to move same between the lowering position and the direct actuation position. The actuator stem 521 can extend parallel to the geometrical axis of the rotating carrier AR of the planetary carrier 250. The actuator 520 can be electrically, pneumatically or hydraulically powered, and couple with a corresponding vehicle 100 powering system. When the actuator stem 521 is coupled to the ring gear 240, movement of the former 521 controls the position of the latter 240. The extension and retraction of the actuator stem 521 can therefore cause a corresponding displacement of the ring gear 240 between the direct actuation position and the reduction position. It should then be noted that the ring gear 240 can be moved between the lowering position and the direct drive position in a variety of ways, in accordance with the present disclosure.

From the foregoing, it should be noted that the epicyclic reducer 210 provided in accordance with the present disclosure allows the two-stage speed reduction of the motor 102 for the wheels 109, which can be selectively disengaged. Two-stage speed reduction can be used, for example, when the vehicle 100 is loaded and torque demands on the wheels 109 are high. To provide two-stage speed reduction, the ring gear 240 of the epicyclic reducer 210 is in the reduction position. When single-stage speed reduction (or no speed reduction) is desired, for example to increase fuel efficiency, when the vehicle 100 is unloaded, the ring gear 240 can be moved to the direct drive position, then the epicyclic reducer 210 does not provide a substantial reduction in speed between the axle shaft 105 and the wheel 109. The speed ratio between the engine 102 and the wheels 109 can then be controlled h the gearbox 103 and can allow, for example, an overload to further increase fuel efficiency.

While this invention has been described in relation to at least one embodiment, it may additionally be modified within the spirit and scope of this disclosure. This application is therefore intended to cover any variations, uses or adaptations of the invention with the use of its general principles. Additionally, that application is intended to cover such deviations from the present disclosure that fall within known or customary practice in the art to which this invention belongs and that fall within the scope of the appended claims.

The invention claimed is:

1. An epicyclic reducer for a wheel hub characterised in that it comprises:
   a sun gear (220) disposed in a housing (211) that comprises sun teeth (221) and is configured to couple to an input (105);
   the housing; a plurality of planetary gears, each comprising planet teeth meshed with some of the sun teeth;
   a planetary carrier that couples planetary gears together and is configured as an output;
   a ring gear comprising ring teeth meshed with some of the planet teeth of each of the planetary gears, the ring gear being displaceable within the housing between a reduction position where the planetary gears are configured to spin relative to the ring gear and a direct drive position where the ring gear is rotatably locked with the planetary gears; and
a biaser acting on the ring gear to urge the ring gear toward the reduction position.

2. The epicyclic reducer according to claim 1, wherein the biaser is a compression spring.

3. The epicyclic reducer of claim 1, wherein the housing comprises a groove in which the biaser is disposed, and the ring gear comprises a piston disposed in the groove.

4. The epicyclic reducer of claim 3, wherein the housing comprises a fluid inlet that is fluidly coupled to the groove.

5. The epicyclic reducer of claim 1, further comprising a locking band with locking teeth that mesh with at least some of the ring teeth, when the ring gear is in the reduction position.

6. The epicyclic reducer of claim 5, wherein the ring teeth of the ring gear are unmeshed with the locking teeth when the ring gear is in the direct drive position.

7. The epicyclic reducer of claim 6, wherein the planetary carrier comprises carrier teeth that mesh with at least some of the ring teeth when the ring gear is in the direct drive position.

8. The epicyclic reducer of claim 1, wherein a rotating speed of the sun gear is substantially equal to a rotational speed of the planetary carrier when the ring gear is in the direct drive position.

9. A vehicle comprising: a chassis;
   an engine carried by the chassis;
   a gearbox configured for coupling to the engine;
   a drive shaft rotatably coupled to the gearbox;
   an axle shaft rotatably coupled to the drive shaft; and
   a wheel hub carried by the chassis and comprising an epicyclic reducer, a sun gear of the epicyclic reducer being rotatably coupled to the axle shaft:
   a housing;
   the sun gear contained in the housing that comprises sun teeth and is rotatably coupled to the axle shaft;
   a plurality of planetary gears, each comprising planet teeth meshed with some of the sun teeth;
   a planetary carrier that couples planetarLgears together and is configured as an output;
   a ring gear comprising ring teeth meshed with some of the planet teeth of each of the planetary gears, the ring gear being displaceable within the housing between a reduction position in which the planetary gears are configured to rotate relative to the ring gear and a direct drive position where the ring gear is rotatable locked onto the planetary gears; and
   a biaser that acts on the ring gear to propel the latter towards the reduction position.

10. The vehicle of claim 9, characterised in that the biaser is a compression spring.

11. The vehicle, according to claim 9, characterised in that the housing comprises a groove containing the biaser and the ring gear comprises a piston disposed in the groove.

12. The vehicle of claim 11, characterised in that the housing comprises a fluid inlet that is fluidly coupled to the groove.

13. The vehicle of claim 9, further comprising a locking band with locking teeth that mesh with at least some of the ring teeth when the ring gear is in the reduction position.

14. The vehicle of claim 13, characterised in that the ring gear teeth are unmeshed with the locking teeth when the ring gear is in the direct drive position.

15. The vehicle of claim 14, characterised in that the planetary carrier comprises support teeth that mesh with at least some of the ring teeth when the ring gear is in the direct drive position.

16. The vehicle of claim 9, further comprising a wheel rotatably coupled to the wheel hub.

17. The vehicle of claim 9, characterised in that a rotary speed of the planetary carrier is substantially equal to a rotary speed of the axle shaft when the ring gear is in the direct drive position.

* * * * *